Feb. 16, 1965    G. C. LENNOX    3,169,815
LAMPHOLDER WITH MOUNTING MEANS
Filed April 19, 1960    3 Sheets-Sheet 1

WITNESSES:
Bernard R. Gieguey
Zigmund H. Germer

INVENTOR
George C. Lennox
BY
D. D. Smith
ATTORNEY

Feb. 16, 1965

G. C. LENNOX 3,169,815

LAMPHOLDER WITH MOUNTING MEANS

Filed April 19, 1960

Feb. 16, 1965    G. C. LENNOX    3,169,815
LAMPHOLDER WITH MOUNTING MEANS
Filed April 19, 1960    3 Sheets-Sheet 3

United States Patent Office 3,169,815
Patented Feb. 16, 1965

3,169,815
LAMPHOLDER WITH MOUNTING MEANS
George C. Lennox, Southbury, Conn., assignor to Westinghouse Electric Corporation, East Pittsburgh, Pa., a corporation of Pennsylvania
Filed Apr. 19, 1960, Ser. No. 23,216
5 Claims. (Cl. 339—52)

My invention relates generally to electrical wiring devices and, more particularly, to new and improved fluorescent lampholders and mounting structures therefor.

As is known, there are presently a great variety in types of plungers for fluorescent lampholders and many different arrangements for mounting such plungers on suitable supports. For example, plungers must be provided for accommodating bi-pin fluorescent lamps, slim line lamps, as well as lamps having recessed terminals. Furthermore, some plungers are non-movably secured to their supporting structures while others are movably mounted within certain limits. Plungers are secured to their supports in many different manners, such, for example, as by flush mounting, internal mounting and surface mounting.

It is also advantageous to provide a lampholder which may be removed from its housing without necessitating disassembly of the housing.

The present invention includes a lampholder which may be assembled with plungers of a unique standard external configuration for any type of fluorescent lamp and which further may have these plungers assembled either substantially non-movably located in the assembly or movably mounted within certain limits, as the lighting system may require. The lampholder design further allows the unit to be flushly mounted, internally mounted or surface mounted on its support dependent upon the requirements of the system. There is further provided means for securing the lampholder to its support wherein the lampholder is removed therefrom without disassembly of the support. The plunger can be secured to its housing or support plate without the use of additional securing means, such as screws, rivets and the like. It is to be further noted that such assemblies are constructed with inexpensively formed parts resulting in a relatively low cost device.

Accordingly, it is an object of my invention to provide a new configuration of lampholder interchangeable with components of other lampholders and adapted for mounting on structures in a novel manner.

Another object of my invention is to provide a novel and versatile mounting structure for plungers of fluorescent lampholders whereby the plungers can be mounted on suitable supports in a plurality of different ways.

A still further object of my invention is to provide a fluorescent lampholder wherein the plunger assembly can be either non-movably secured or movably mounted within certain limits by minor changes in its mounting bracket.

Another object of my invention is to provide a novel fluorescent lampholder structure wherein the plunger thereof is secured to a suitable support without utilizing conventional securing means.

Another object of my invention is to provide a novel lampholder assembly having novel means for supporting a lead wire.

Still another object of my invention is to provide a new and improved lampholder assembly having a plunger therein wherein the assembly can be easily removed from the lampholder without disassembling the lampholder housing.

A more particular object of my invention is to provide a lampholder assembly which includes a mounting clip having a plunger mounted therein and biased in one direction wherein the assembly can be easily secured to a suitable support.

A still more particular object of my invention is to provide a lampholder assembly which includes a U-shaped clip having a plunger mounted between the spaced arms thereof, which is either stationarily mounted or longitudinally movable within defined limits along the arms of the clip and having resilient means reacting between the bight portion of the clip and one side of the plunger for biasing the latter in one direction.

A further object of my invention is to provide a plunger for a fluorescent lampholder having a novel outer configuration which permits assembly of the plunger with interchangeable mounting structures so that the plunger is either stationarily mounted or movable within defined limits.

For a better understanding of the nature and objects of my invention and for further objects of my invention, reference may be had to the following detailed description of illustrative embodiments of my invention taken in conjunction with the accompanying drawings; in which.

Figure 6:
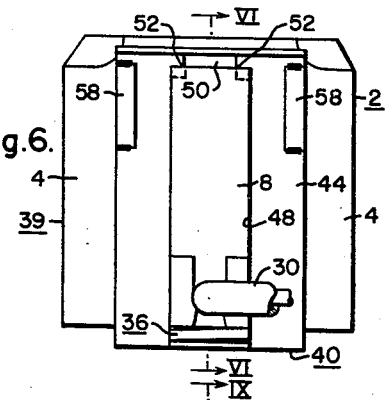
FIG. 6 is a side elevational view similar to FIG. 3 and showing a complete lampholder assembly having the plunger mounted in a mounting clip in one manner.
Figure 7:
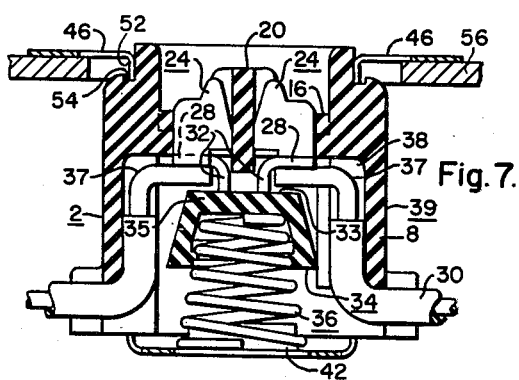
FIG. 7 is a sectional view similar to FIG. 5 and showing a complete lampholder assembly having the plunger mounted in a mounting clip in the same manner as illustrated in FIG. 6 taken along the line VI—VI thereof.
Figure 8:
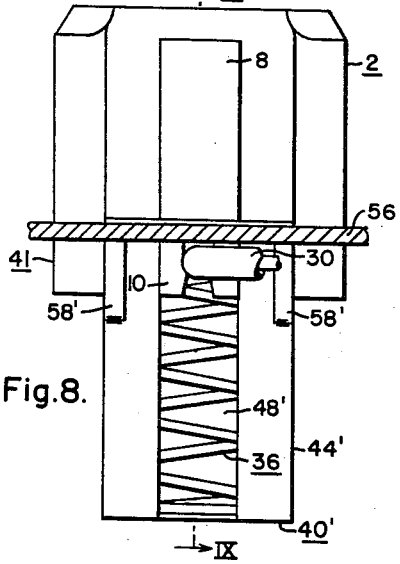
FIG. 8 is a side elevational view similar to FIG. 6 and showing another type of lampholder assembly constructed in accordance with the invention.
Figure 9:
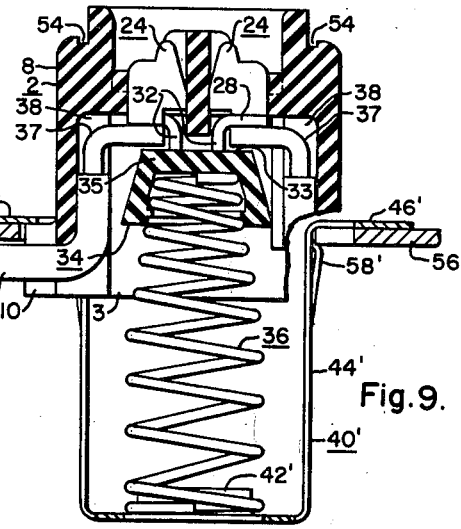
FIG. 9 is a sectional view of the plunger similar in scope to FIG. 7 and further illustrative of the assembly shown in FIG. 8, taken along the line IX—IX thereof.

Referring to the embodiments of my invention shown in FIGS. 1 through 9, there is provided a lampholder assembly particularly adapted for use with lamps having recessed terminals. A single plunger construction, illustrated in FIGS. 1–5, is illustrated to cooperate with two different types of lampholder assembly mountings, one having a relatively non-movable plunger (FIGS. 6 and 7) and the other having a plunger movable within certain limits (FIGS. 8 and 9). It is to be noted that when mounting the assemblies on suitable spaced supports, two assemblies are used to support one lamp and at least one of these assemblies must be provided with a plunger movable within certain defined limits so that the ends of a lamp may be engaged and supported by both lampholders.

Basically, the lampholder assembly includes a cup-shaped plunger of insulating material, a pair of spaced contacts mounted in the plunger, a U-shaped mounting clip engaging the plunger and resilient means reacting between the mounting clip and the spaced contacts to bias the contacts and the plunger in one direction. The illustrative form of my invention shown in FIGS. 1 through 9 utilizes a coiled spring and a button of insulating material as the means for biasing the contacts. Thus, one end of the coiled spring engages a portion of the mounting clip and the other end of the spring engages the insulating button which acts to isolate the spring from the electrical circuit so that a portion of the insulating button engages the spaced contacts of the lampholder.

More specifically, a cup-shaped plunger 2 of FIGS. 1–9 is formed from a suitable insulating material so that the plunger 2 may be constructed as a one-piece member having the specific configuration hereinafter described, such, for example, as a molded plastic insulating material. The plunger 2 is provided with a pair of spaced opposed arcuate side walls 4 which are joined by a pair of opposed flat side walls 6. Extending outwardly from and longitudinally along each of the walls 6 is an integral, generally L-shaped projection 8 formed of a width less than the width of the flat walls 6. The base 10 of the L-shaped projection 8 is located adjacent the open side of the plunger 2 and extends outwardly from the stem of the L-shaped projection 8 so that the bases 10 extend outwardly in opposite directions. The top surface 12 of the plunger 2 is formed to accommodate the conventional recessed terminal fluorescent lamp and is provided with an inwardly extending oval recess 15. The innermost wall 16 of the recess 15 is provided with a pair of spaced aligned contact receiving openings 18 which extend through the wall 16 to the interior of the plunger 2. An integral projection or barrier 20 extends outwardly from the wall 16 and separates the contact receiving opening 18. The barrier 20 is provided with a pair of spaced contact supporting notches 22 which are aligned with the contact receiving opening 18 and which cooperate with the plunger 2 to position a pair of spaced contacts 24 of the lampholder. The contacts 24 are formed from a material having suitable strength properties and good electrical conductivity, such, for example, as a copper alloy, and are generally planar in form. Each contact 24 is located in the plunger in the supporting portions formed by the openings 18 and notches 22. The surface of the contact 24 which is located adjacent the innermost wall 26 of the notch 22 is formed to have a lower portion engage the wall 26 and the upper portion thereof recedes from the wall 26 so that when the electric contacts of the lamp engage the contacts 24, the contacts 24 will be biased inwardly toward the wall 26. Each contact 24 is provided with a lateral extension 28 extending outwardly from the lower edge thereof which engages the inner surface of the bottom wall 16 of the recess 15 to limit movement of the contacts 24 through the openings 18. The bared end of an electrically conducting lead wire 30 is secured to the extension 28 of the contact 24 by suitable means, such, for example, as by brazing. Each contact extension 28 is provided with a downwardly extending projection 32 which engages the upper surface of an insulating button 34. The insulating button 34 is biased upwardly by a coiled spring 36, to be described hereinafter, and the contacts 24 are thereby biased upwardly into the recess 15.

Figure 2:
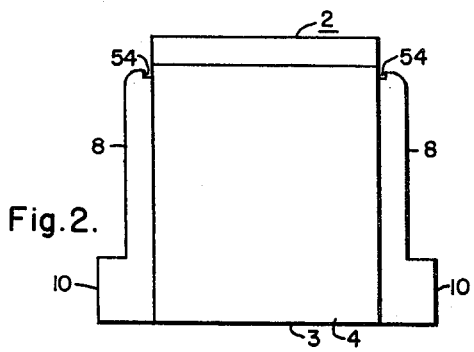
FIG. 2 is a side elevational view of the assembly shown in FIG. 1.
Figure 3:
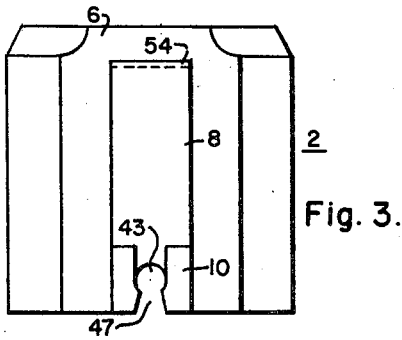
FIG. 3 is an end elevational view of the plunger assembly shown in FIG. 1.
Figure 1:
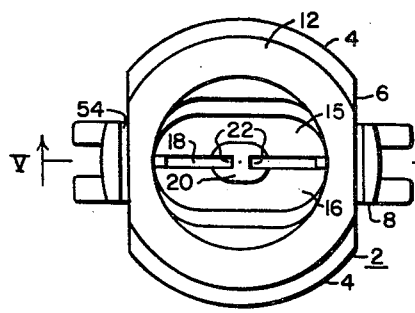
FIGURE 1 is a top view of one type of plunger assembly constructed in accordance with the principles of my invention.
Figure 4:
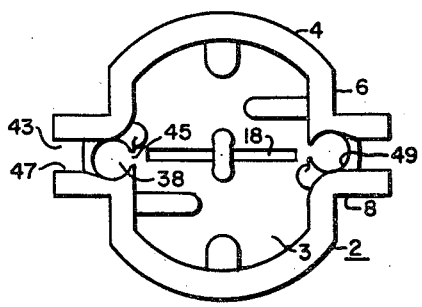
FIG. 4 is a bottom plan view of the plunger assembly shown in FIG. 1.
Figure 5:
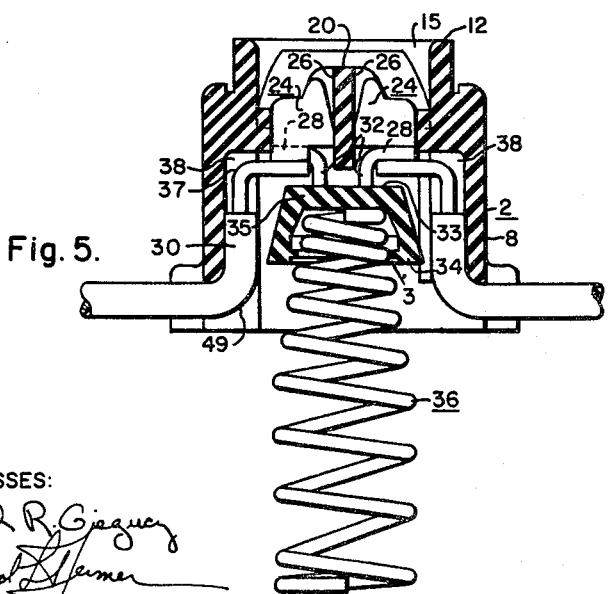
FIG. 5 is a sectional view of the plunger shown in FIGS. 1 through 4 illustrating the mounting of the contacts therein and taken substantially along the line V—V of FIG. 1, and with biasing spring and electric leads added.

The bared end portion of each lead wire 30 extends outwardly to the inner surface of the adjacent side wall 6 of the plunger and is then bent downwardly, as viewed in FIGS. 5, 7 and 9, along the adjacent side wall 6. An elongated longitudinally extending slot 38 is formed in the plunger 2 along the inner surface of the side wall 6 to accommodate the lead wire 30 and fixedly to locate the latter adjacent the inner surface of the side wall 6. The lead wire 30 is then bent laterally toward the side wall 6 and extends through an opening 43 located in the base 10 of the projection 8. It is to be noted that the slot 38 and the opening 43 are generally circular in cross section (FIGS. 3 and 4) and have open sides 45 and 47 thereon, respectively, to allow for the insertion of the lead wire. The open sides 45 and 47 comprise segments of the circumference of the circles formed by the slot 38 and opening 43 which are less than 180° of the arc so that the slot 38 and opening 43 retain the lead wire therein, respectively. It is to be further noted that since the slot 38 and opening 43 extend laterally with respect to each other strain relief for the lead wire 30 is provided.

The open side 45 of the slot 38 is formed of a size greater than the diameter of the bared end of the lead wire but less than the diameter of the lead wire covering. Thus, it may be seen that the lead wire 30 and its associated contact 24 are assembled to the plunger 2 by first laterally bending the bared portion of the wire at 37, locating the bared end of the lead wire so that it extends out of the open side 45 of the slot 38 and into the interior of the plunger 2 and then inserting the lead wire 30 and the contact 24 from the bottom end 49 of the slot 38 until the contact 24 is properly located in the contact receiving opening 18. As seen in FIG. 5, the lead wire 30 is thus maintained in the slot 38 so that the electric conducting circuit is isolated from the spring 36. The lead wire 30 is provided with a deformable covering and the lead wire is again bent laterally over the base 10 of the L-shaped projection 8, and the covering is deformed into the slot 43 through the open side 47 thereof.

The insulating button 34 is formed from a suitable material such as the material used in forming the plunger 2 and is generally cup-shaped with its open side 3 facing the bottom side of the plunger 2. The outwardly facing surface 33 of the bottom wall 35 of the insulating button 34 engages the projections 32 of the contact 24 and one end of the helical spring 36 is located in the button 34 and engaging the bottom wall thereof. By providing a cup-shaped button 34, it is to be noted that the spring 36 is maintained in insulated relationship with respect to the contacts 24 and the bared ends of the lead wire 30.

A lampholder assembly where the plunger 2 is non-movably mounted thereon so as to provide for fixed lamp end support, denoted generally as 39, is completed by assembling the plunger 2, contacts 24, insulating button 34 and spring 36 with a U-shaped mounting clip 40 (FIGS. 6 and 7). In order to emphasize that the same element is used as a contact supporting member both in the plunging and non-plunging type assemblies, the term "plunger" will be employed in describing both types, but in the non-plunging type assembly the plunger 2 will be referred to as a "fixed" plunger in order to clarify the fact that it is nonmovable in this particular case. The mounting clip 40 may be formed from a resilient metal having suitable strength properties such, for example as sheet steel. The bight of the mounting clip 40 is provided with an upwardly extending projection 42 located between spaced arms 44 thereof. The projection 42 is formed of a size to receive the other end of the spring 36 and prevents lateral movement thereof, i.e., along the plane of the bight. Each upper end of the arms 44 of the mounting clip 40 terminate with an outwardly extending tab 46 and each arm 44 is provided additionally with an elongated centrally located slot 48 which extends from the inner edge of the arm 44 to a point adjacent the outer edge thereof. The slot 48 terminates in a narrow extension 50 which extends upwardly through the tab 46 and cooperates with the slot 48 to form spaced shoulders 52 adjacent the upper edge of the slot 48 (FIG. 6). The outer end of the stem of the projection 8 is provided with a transverse notch 54 located adjacent the side wall 6 which is adapted to receive the shoulder 52 of the mounting clip 40 in the manner hereinafter described. The slots 48 are formed with the same dimensions as the projections 8 and are adapted to receive the projections 8 therein.

To assemble the complete lampholder, the contacts 24 are inserted into the fixed plunger 2 in the manner heretofore described. The insulating button 34 is inserted into the fixed plunger 2 so that it engages the projections 32 of the contacts 24. One end of the spring 36 is located in the insulating button 34 and the arms 44 of the mounting clip 40 are spread apart so that the other end of the spring 36 engages the projection 42 on the bight of the mounting clip 40. The fixed plunger 2 is then moved downwardly toward the bight of the mounting clip 40 compressing the spring 36 until the projections 8 are located in the slots 48 of the mounting clip 40. The spring 36 is further compressed until the upper end of the projection 8 is aligned with the shoulders 52 and the arms 44 of the clip 40 are moved inwardly toward the side walls 6 of the fixed plunger 2 until the shoulders 52 are aligned with the notches 54, respectively. When the shoulders 52 are in the aforesaid position the force compressing the spring 36 is removed and the spring 36 moves the plunger away from the bight of the mounting clip 40 until the inner surfaces of each notch 54 engage the shoulders 52. It can be seen that the arms 44 of the mounting clip 40 cannot be spread apart because of the interaction of the side walls of the notches 54 with the shoulders 52, respectively. It is to be further noted that the lead wire 30 extends through the slot 48 in the arms 44 of the mounting clip and can then be connected to a source of electrical potential. An entire lampholder assembly is thereby provided wherein the fixed plunger 2 is non-movably secured to its mounting clip 40 and the assembly can then be secured to a suitable support illustrated generally as 56. The assembly can be secured to the support 56 in a plurality of ways such, for example as by passing screws (not shown) through aligned openings in the tabs 46 or 46' and the support 56.

Another method of mounting the assembly to the support 56 comprises the elimination of conventional securing means such as screws. In this scheme, each of the arms 44 of the mounting clip 40 is provided with a pair of resilient outwardly extending projections 58 or 58' (FIGS. 6 and 9) located adjacent the tabs 46 or 46'. Thus, the assembly is secured to the support 56 by passing the mounting clip 40 through a suitably shaped opening in the support 56 until a frontal shoulder portion of the projections 58 or 58' are moved past the support 56 and the tabs 46 flushly engage the front surface of the support 56.

In the illustrative embodiment of my invention shown in FIGS. 8 and 9, there is provided a lampholder assembly 41 wherein the plunger 2 is movable longitudinally along the arms 44 of the mounting clip 40 within definite limits so as to allow for lamp insertion between two spaced lampholders and so as to allow for resilient lamp engagement. The provision of the movable plunger is accomplished by modifying the slot in the arms 44 of the mounting clip 40. Thus, a resulting mounting clip 40' is provided with a bight portion having a projection 42' thereon similar to the projection 42 and adapted to engage one end of the spring 36. The mounting clip 40' is provided with a pair of spaced arms 44' extending outwardly from the bight thereof and terminating in a pair of laterally extending tabs 46'. The arms 44' are provided with a longitudinal slot 48' which extends from the bight of the mounting clip 40' to the tabs 46' and is formed of a size to receive the projections 8 on the plunger 2. The opening 48' continues laterally and outwardly along the tab 46' and the continuation thereof (not shown) is of a size to receive the stem portion of the projection 8 but is of a size so that the base 10 thereof cannot pass therethrough. Accordingly, the lampholder is assembled in the same manner as the lampholder assembly 39 except that the interaction of the shoulders 52 with the notches 54 is eliminated. Thus the spring 36 biases the plunger 2 upwardly toward the tabs 46' until the bases 10 of the projections 8 engage the under sides of the tabs 46', respectively.

It is to be noted that the assembly 41 (FIGS. 8 and 9) differs from the assembly 39 (FIGS. 6 and 7) only by minor modifications of the mounting clips 40 and 40' and that all other parts of the assembly are interchangeable. Each of the assemblies may be secured to the support 56 in the same manner such as by cooperation of the tabs 46' and the resilient projections 58' on the mounting clip 40' as previously described with reference to the assembly 39.

Figure 10:
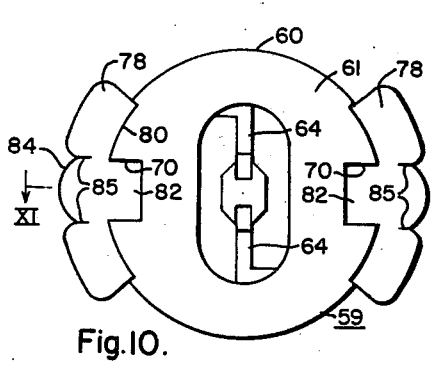
FIG. 10 is a top plan view of another plunger assembly constructed in accordance with the principles of my invention and which is mounted in another type of lampholder assembly.
Figure 11:
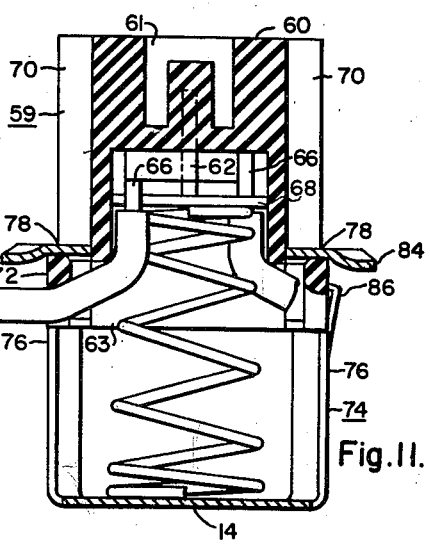
FIG. 11 is a sectional view of the assembly shown in FIG. 10 and taken substantially along the lines XI—XI thereof.

A still further modification of my invention is shown in FIGS. 10 and 11, wherein a slot in the mounting clip and a projection on the plunger are reversed and there is provided an assembly 59 having a projection on the mounting clip and a slot in the plunger. Thus, a plunger 60 formed of a suitable insulating material such, for example as the material used for the plunger 2 is provided with a suitable configuration for receiving and supporting a fluorescent lamp having recessed terminals. A pair of spaced contacts 62 are provided to be located in contact receiving openings 64 and are exposed to the top surface 61 of the plunger 60. A lead wire 66 is secured to each of the contacts 62 in the same manner as the lead wire 30 is secured to the contacts 24 and an insulating partition 68 is provided to engage a downwardly extending portion of the contact 62 to bias the latter toward the front of the plunger 60. A pair of spaced opposed slots 70 are located in opposed portions of the side wall of the plunger 60 and extend downwardly from the top surface 61 of the plunger 60 to a point adjacent the open end or bottom 63 of the plunger 60. An outwardly extending integral projection 72 is provided at the lower end of the slot 70 and may be formed similar to the base 10 of the L-shaped projection 8 of the other embodiments of my invention. A U-shaped mounting clip 74 is provided with a bight portion 14 and a pair of spaced arms 76. The arms 76 each terminate in a laterally extending tab 78 whose inner edge 80 conforms to the shape of the side wall of the housing. Each tab 78 is provided with a co-planar inwardly extending portion 82 located in the slot 70 of the plunger 60. The lampholder is therefore assembled in the same manner as the assembly 41 with the plunger 60 being movable along the mounting clip 74 within predetermined limits. Viewing FIG. 11, it may be seen that the plunger 60 is movable longitudinally along the arms 76 of the mounting clip 74 until the projections 72 of the plunger 60 engage the projections 82 of the tabs 78.

The outer edge of the tabs 78 are preferably provided with resilient downwardly extending resilient portions 84 as viewed in FIG. 11, which desirably are made resilient by slots 85 and which cooperate to secure the lampholder assembly 59 to a suitable support (not shown) similar to the support 56. The arms 76 of the mounting clip 74 are preferably provided with resilient outwardly extending projections 86 located adjacent the tabs 78, similar to the projections 58 and 58'. Thus, when the assembly 59 of FIG. 11 is secured to a support, the resilient portions 84 are biased upwardly by the support and react to bias the support downwardly into firmer engagement with the upper edge of the projections 86. Thus, it may be seen that the cooperation between the resilient portions 84 and the resilient projections 86 act to maintain the lampholder assembly in very firm engagement with the support.

It is to be noted that a lampholder assembly having a relatively non-movable or fixed plunger can be formed similar to the assembly 59 by merely modifying the plunger 60, for example, by extending the projection 72 upwardly into the slot 70 until the projection 72 is located adjacent the front surface of the plunger 60. Alternatively, the mounting clip 74 can be provided with projections similar to the projections 78, but disposed closer to the bight thereof.

Figure 12:
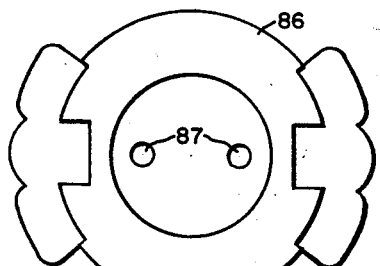
FIG. 12 is a top plan view of an assembly similar to that shown in FIG. 10 but utilizing a different type of plunger therewith.
Figure 13:
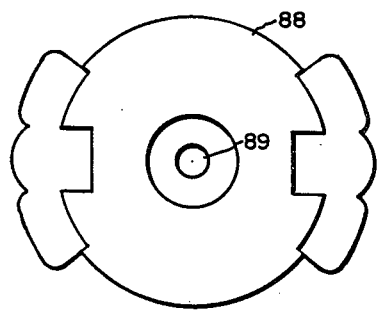
FIG. 13 is a top plan view of another assembly similar to that shown in FIG. 10 and utilizing still another type of plunger therewith.

Referring now to FIGS. 12 and 13, there are shown variations of the embodiment of my invention in FIGS. 10 and 11. More specifically, FIG. 12 illustrates a plunger 86 suitable for use iwth a conventional bi-pin fluorescent lamp, while FIG. 13 shows a plunger 88 suitable for use with a slim-line fluorescent lamp. It is to be noted that while a specific contact structure for the assemblies shown in FIGS. 12 and 13 is not shown, appropriate contacts may be suitably mounted and biased in the same general manner as shown and described with reference to the other embodiments of my invention. Therefore, the embodiments of my invention shown in FIGS. 12 and 13 differ from the embodiments shown in FIGS. 10 and 11 only by the provision of a different plunger together with suitable contacts therefor so that different types of lamps may be supported thereby. The plunger 86 of FIG. 12 is provided with contacts and contact openings 87 for receiving a conventional bi-pin fluorescent lamp while the plunger 88 of FIG. 13 is provided with a contact opening 89 for receiving the single contact of a slim line fluorescent lamp. Otherwise, the assemblies are formed substantially as those illustrated in FIGS. 10 and 11.

Figure 15:
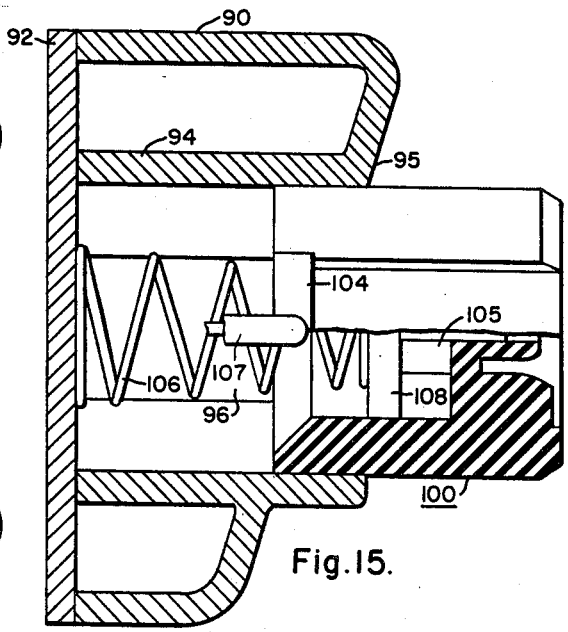
FIG. 15 is a sectional view depicting the lampholder shown in FIG. 14, illustrating internal mounting of the plunger, and taken substantially along the lines XV—XV of FIG. 14.
Figure 14:
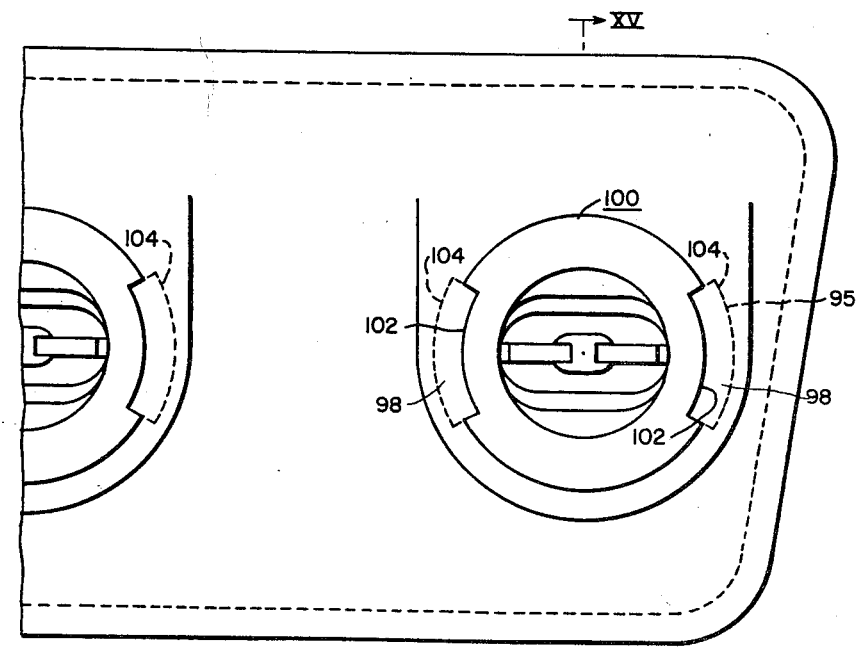
FIG. 14 is a top plan view of one form of housing for fluorescent lampholders and showing a pair of plunger assemblies mounted thereon.

Referring now to the embodiment of my invention shown in FIGS. 14 and 15, there is provided a lampholder utilizing the basic concepts of my invention, wherein the plunger is mounted in a more conventional support rather than in a separate mounting clip. More specifically, there is provided a cup-shaped housing 90 having a backing plate 92 sized to enclose the open back of the housing 90. Both the housing 90 and the back plate 92 are preferably formed from material having suitable strength characteristics, such as sheet steel. The housing 90 desirably is formed with a tubular plunger supporting structure 94 which extends inwardly from the front surface 95 thereof. The supporting structure 94 is generally circular in cross section and is provided with a pair of diametrically opposed slots 96 extending longitudinally from the back plate 92 to a position adjacent the front surface of the housing 90. The supporting structure 94 is provided with a pair of diametrically opposed, inwardly extending portions 98 on the front surface 95 thereof conforming to the adjacent cross sectional configuration of a plunger 100 'o limit movement of the plunger 100 along the supporting structure 94. The plunger 100 is illustrated as a plunger adapted to receive a conventional fluorescent lamp having recessed terminals and is provided with a pair of diametrically opposed slots 102 adapted to be aligned with the portions 98 of the housing 90. The slots 102 extend longitudinally to areas near the base of the plunger 100, where they respectively adjoin outwardly extending projections 104 adjacent the inner end or base of the plunger. The projections 104 are adapted to be located in the slots 96 of the supporting structure 94 and to be moved longitudinally along the slots 96. A biasing spring 106 is provided to react between the back plate 92 and an insulating partition 108 located in engagement with the inner end of the contacts 105 of the plunger. The spring 106 therefore biases the plunger 100 toward the front surface of the housing 90 so that the plunger 100 is movable within predetermined limits along the supporting structure 94, which motion is opposed in one direction by the spring 106.

To assemble the lampholder, the contacts 105, with conductively attached lead wires 107 and the insulating partition 108 are mounted in the plunger in a suitable manner and the projections 104 of the plunger 100 are located in the slots 96 of the supporting structure 94 by merely passing the plunger 100 through the open side of the housing 90 and the open ends of the slots 96. The spring 106 is located so that one end thereof engages the partition 108 and the other end engages the cover 92, and the cover 92 is secured to the housing 90 by suitable means (not shown).

Viewing the embodiment of my invention shown in FIGS. 14 and 15, it is to be noted that the principles of my invention may be utilized not only as a separate lampholder assembly but also with a conventional lampholder housing 90. Furthermore, a non-movable plunger can be provided or the range of plunger movement can be varied by making a simple modification to the lampholder shown in FIGS. 14 and 15, for example, by suitably adjusting the length of the slot 96 or by correspondingly increasing the length of the projection 104.

From the foregoing description of specific embodiments of my invention, it is to be noted that numerous changes may be made without departing from the broad spirit and scope thereof. Accordingly, it is specifically intended that the foregoing description be interpreted as illustrative and not in a limiting sense.

I claim as my invention:

1. A lampholder comprising a U-shaped mounting member having respective guide slots extending longitudinally to the outer end of each arm thereof, an elongated contact supporting member located between said arms and having laterally outwardly and longitudinally extending guide projections formed on opposed sides thereof, said guide projections being located in said slots, respectively, resilient means reacting between the bight portion of said mounting member and said contact supporting member to bias the latter outwardly of said bight portion, the outer end of each of said arms having a laterally extending support portion, said guide projections respectively having an abutment portion facing longitudinally outward from the outer end thereof and respectively having another abutment portion projecting further laterally outwardly from a longitudinally inward portion thereof, said support portions engageable with one of the pairs of abutment portions to limit the longitudinal outward movement of said contact supporting member.

2. A lampholder comprising a U-shaped mounting member having respective guide slots extending longitudinally to the outer end of each arm thereof, an elongated contact supporting member located between said arms and having laterally outwardly and longitudinally extending guide projections formed on opposed sides thereof, said guide projections being located in said slots, respectively, resilient means reacting between the bight portion of said mounting member and said contact supporting member to bias the latter outwardly of said bight portion, the outer end of each of said arms having a laterally extending shoulder support portion, said guide projections respectively having an abutment portion facing longitudinally outward from the outer end thereof and respectively having another abutment portion projecting further laterally outwardly from a longitudinally inward portion thereof, said shoulder support portions engaging the outer abutment portions to hold said contact supporting member in relatively fixed relation with said mounting member.

3. A lampholder comprising a U-shaped mounting member having respective guide slots extending longitudinally to the outer end of each arm thereof, an elongated contact supporting member located between said arms and having laterally outwardly and longitudinally extending guide projections formed on opposed sides thereof, said guide projections being located in said slots, respectively, resilient means reacting between the bight portion of said mounting member and said contact supporting member to bias the latter outwardly of said bight portion, the outer end of each of said arms having a laterally extending support portion, said support portions respectively having an opening contiguous with the adjacent arm slot so as to allow movement of said guide projections outwardly of the outer ends of said arms, said guide projections respectively having an abutment portion projecting further laterally outwardly from a longitudinally inward portion thereof and engageable with the associated support portion to limit the outward movement of said contact supporting member.

4. A lampholder comprising a U-shaped mounting member having respective guide slots extending longitudinally to the outer end of each arm thereof, a cup-shaped plunger of insulating material located between the arms of said mounting member with the open end of said plunger being disposed to face the bight portion of said mounting member, said plunger having laterally outwardly extending guide projections formed on opposed sides thereof and respectively located in said slots so that said plunger is longitudinally movable along the arms of said mounting member, contact means disposed in said plunger adjacent an inner surface thereof, said inner surface having at least one opening therein for exposing said contact means to the exterior of said plunger, resilient means reacting between the bight portion of said mounting member and said inner surface of said plunger to bias said plunger away from said bight portion, insulating means disposed between said contact means and said resilient means for insulating said contact means from the remainder of said lampholder, the outer end of each of said arms having a laterally extending support portion, said guide projections respectively having an abutment portion facing longitudinally outward from the outer end thereof and respectively having another abutment projecting further laterally outwardly from a longitudinally inward portion thereof, said support portions engageable with one of the pairs of abutment portions to limit the longitudinal outward movement of said contact supporting member, and a wire channel extending through each of said other abutment portions and having an open side facing said mounting member bight portion so as to allow connecting wires for said contact means to be led from said lampholder without interference with the positioning of said plunger.

5. A lampholder comprising a U-shaped mounting member having respective guide slots extending longitudinally to the outer end of each arm thereof, an alongated contact supporting member located between said arms and having laterally outwardly and longitudinally extending guide projections formed on opposed sides thereof, said guide projections being located in said slots, respectively, resilient means reacting between the bight portion of said mounting member and said contact supporting member to bias the latter outwardly of said bight portion, the outer end of each of said arms having a laterally extending support portion, said guide projections respectively having an abutment portion facing longitudinally outward from the outer end thereof and respectively having another abutment portion projecting further laterally outwardly from a longitudinally inward portion thereof, said support portions engageable with one of the pairs of abutment portions to limit the longitudinal outward movement of said contact supporting member, and a wire channel extending through each of said other abutment portions and having an open side facing said mounting member bight portions so as to allow connecting wires for contact means in said contact supporting member to be led from said lampholder without interference with the positioning of said contact supporting member.

References Cited in the file of this patent

UNITED STATES PATENTS

| | | |
|---|---|---|
| 1,975,820 | Wright | Oct. 9, 1934 |
| 2,182,446 | Nelson | Dec. 5, 1939 |
| 2,219,327 | Miller | Oct. 29, 1940 |
| 2,393,616 | DeReamer et al. | Jan. 29, 1946 |
| 2,495,196 | Kulka | Jan. 17, 1950 |
| 2,495,623 | Benander | Jan. 24, 1950 |
| 2,511,037 | Bedoiseau | June 13, 1950 |
| 2,705,784 | Murphy | Apr. 5, 1955 |
| 2,716,739 | Lemmers | Aug. 30, 1955 |
| 2,922,136 | Corcoran | Jan. 19, 1960 |

FOREIGN PATENTS

| | | |
|---|---|---|
| 667,810 | Great Britain | Mar. 5, 1952 |